(12) United States Patent
Li et al.

(10) Patent No.: US 12,099,897 B2
(45) Date of Patent: Sep. 24, 2024

(54) IMAGE PROCESSING FOR SCANNING DEVICES BASED ON LASER AIMER POSITION

(71) Applicant: Hand Held Products, Inc., Charlotte, NC (US)

(72) Inventors: Jian Li, Charlotte, NC (US); Minyi Wang, Charlotte, NC (US); Jian Xing, Charlotte, NC (US); Liu Hongyan, Charlotte, NC (US); Lidong Gu, Charlotte, NC (US); Yu Hu, Charlotte, NC (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

(21) Appl. No.: 18/312,694

(22) Filed: May 5, 2023

(65) Prior Publication Data
US 2023/0376713 A1 Nov. 23, 2023

(30) Foreign Application Priority Data
May 20, 2022 (CN) .......................... 202210565744.2

(51) Int. Cl.
*G06K 7/14* (2006.01)
*G06K 7/10* (2006.01)
*G06T 1/20* (2006.01)
*G06T 1/60* (2006.01)

(52) U.S. Cl.
CPC ....... *G06K 7/1417* (2013.01); *G06K 7/10712* (2013.01); *G06K 7/10841* (2013.01); *G06T 1/20* (2013.01); *G06T 1/60* (2013.01)

(58) Field of Classification Search
CPC ............ G06K 7/1417; G06K 7/10712; G06K 7/10841
USPC ...................................... 235/462.01
See application file for complete search history.

(56) References Cited

U.S. PATENT DOCUMENTS

| | | | |
|---|---|---|---|
| 5,015,867 A * | 5/1991 | Siegel | B65H 63/062 356/73.1 |
| 7,478,753 B2 | 1/2009 | Patel et al. | |
| 8,471,812 B2 | 6/2013 | Bunch | |
| 9,202,094 B1 | 12/2015 | Chen et al. | |

(Continued)

FOREIGN PATENT DOCUMENTS

EP 3920077 A1 12/2021

OTHER PUBLICATIONS

European search report Mailed on Oct. 13, 2023 for EP Application No. 23171604, 9 page(s).

*Primary Examiner* — Allyson N Trail
(74) *Attorney, Agent, or Firm* — Alston & Bird LLP

(57) ABSTRACT

Image processing for scanning devices based on laser aimer position, wherein a first frame and a second frame of image data related to an object associated with a barcode are captured using a scanning device. A difference between first pixel data for a first grouping of pixels associated with the first frame and second pixel data for a second grouping of pixels associated with the second frame is computed. Additionally, a location of a laser aimer pattern in the first frame or the second frame is determined based on a comparison between respective differences between the first pixel data for the first grouping of pixels and the second pixel data for the second grouping of pixels, where the laser aimer pattern is created by the scanning device.

20 Claims, 9 Drawing Sheets

(56) References Cited

U.S. PATENT DOCUMENTS

| | | |
|---|---|---|
| 2004/0035933 A1 | 2/2004 | Havens et al. |
| 2006/0038017 A1* | 2/2006 | Carlson .................... G02B 7/08 |
| | | 235/462.24 |
| 2007/0108284 A1* | 5/2007 | Pankow ............. G06K 7/10851 |
| | | 235/462.21 |
| 2007/0228306 A1* | 10/2007 | Gannon ............. G06K 7/10722 |
| | | 250/555 |
| 2014/0168633 A1* | 6/2014 | Guetta ................. G08B 13/189 |
| | | 356/5.01 |
| 2015/0339506 A1* | 11/2015 | Chen .................. G06K 7/10732 |
| | | 235/462.21 |
| 2017/0343345 A1* | 11/2017 | Wittenberg ............. G01C 3/085 |
| 2022/0100979 A1 | 3/2022 | Fernandez-Dorado et al. |
| 2023/0156346 A1 | 5/2023 | Giordano et al. |
| 2023/0376713 A1* | 11/2023 | Li .............................. G06T 1/60 |

\* cited by examiner

IMAGE PROCESSING FOR SCANNING DEVICES BASED ON LASER AIMER POSITION

CROSS-REFERENCE TO RELATED APPLICATIONS

This application claims priority pursuant to 35 U.S.C. 119(a) to Chinese Application No. 202210565744.2, filed May 20, 2022, which application is incorporated herein by reference in its entirety.

TECHNICAL FIELD

The present disclosure relates generally to imaging systems, and more particularly to data capture and image processing for imagery related to objects of interest.

BACKGROUND

Scanning devices such as, for example, barcode scanners or other sensor devices, are often employed in material handling environments, as well as other environments related to access control, transportation and logistics, etc. However, inefficiencies and/or inaccuracies can occur as a result of traditional data capture and/or image processing performed by a scanning device.

BRIEF SUMMARY

In accordance with an embodiment of the present disclosure, a system comprises a processor and a memory. The memory stores executable instructions that, when executed by the processor, cause the processor to capture, using a scanning device, a first frame and a second frame of image data related to an object associated with a barcode. The executable instructions, when executed by the processor, also cause the processor to compute a difference between first pixel data for a first grouping of pixels associated with the first frame and second pixel data for a second grouping of pixels associated with the second frame. The executable instructions, when executed by the processor, also cause the processor to determine a location of a laser aimer pattern in the first frame or the second frame based on a comparison between respective differences between the first pixel data for the first grouping of pixels and the second pixel data for the second grouping of pixels, wherein the laser aimer pattern is created by the scanning device. The executable instructions, when executed by the processor, also cause the processor to compute a distance between an optical engine of the scanning device and the object based on the location of the laser aimer pattern. The executable instructions, when executed by the processor, also cause the processor to perform image processing with respect to the barcode based on the distance between the optical engine of the scanning device and the object.

In accordance with another embodiment of the present disclosure, a method provides for capturing, using a scanning device, a first frame and a second frame of image data related to an object associated with a barcode. The method also provides for computing a difference between first pixel data for a first grouping of pixels associated with the first frame and second pixel data for a second grouping of pixels associated with the second frame. The method also provides for determining a location of a laser aimer pattern in the first frame or the second frame based on a comparison between respective differences between the first pixel data for the first grouping of pixels and the second pixel data for the second grouping of pixels, wherein the laser aimer pattern is created by the scanning device. The method also provides for computing a distance between an optical engine of the scanning device and the object based on the location of the laser aimer pattern. The method also provides for performing image processing with respect to the barcode based on the distance between the optical engine of the scanning device and the object.

In accordance with yet another embodiment of the present disclosure, a computer program product is provided. The computer program product comprises at least one computer-readable storage medium having program instructions embodied thereon, the program instructions executable by a processor to cause the processor to capture, using a scanning device, a first frame and a second frame of image data related to an object associated with a barcode. The program instructions are also executable by the processor to cause the processor to compute a difference between first pixel data for a first grouping of pixels associated with the first frame and second pixel data for a second grouping of pixels associated with the second frame. The program instructions are also executable by the processor to cause the processor to determine a location of a laser aimer pattern in the first frame or the second frame based on a comparison between respective differences between the first pixel data for the first grouping of pixels and the second pixel data for the second grouping of pixels, wherein the laser aimer pattern is created by the scanning device. The program instructions are also executable by the processor to cause the processor to compute a distance between an optical engine of the scanning device and the object based on the location of the laser aimer pattern. The program instructions are also executable by the processor to cause the processor to perform image processing with respect to the barcode based on the distance between the optical engine of the scanning device and the object.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
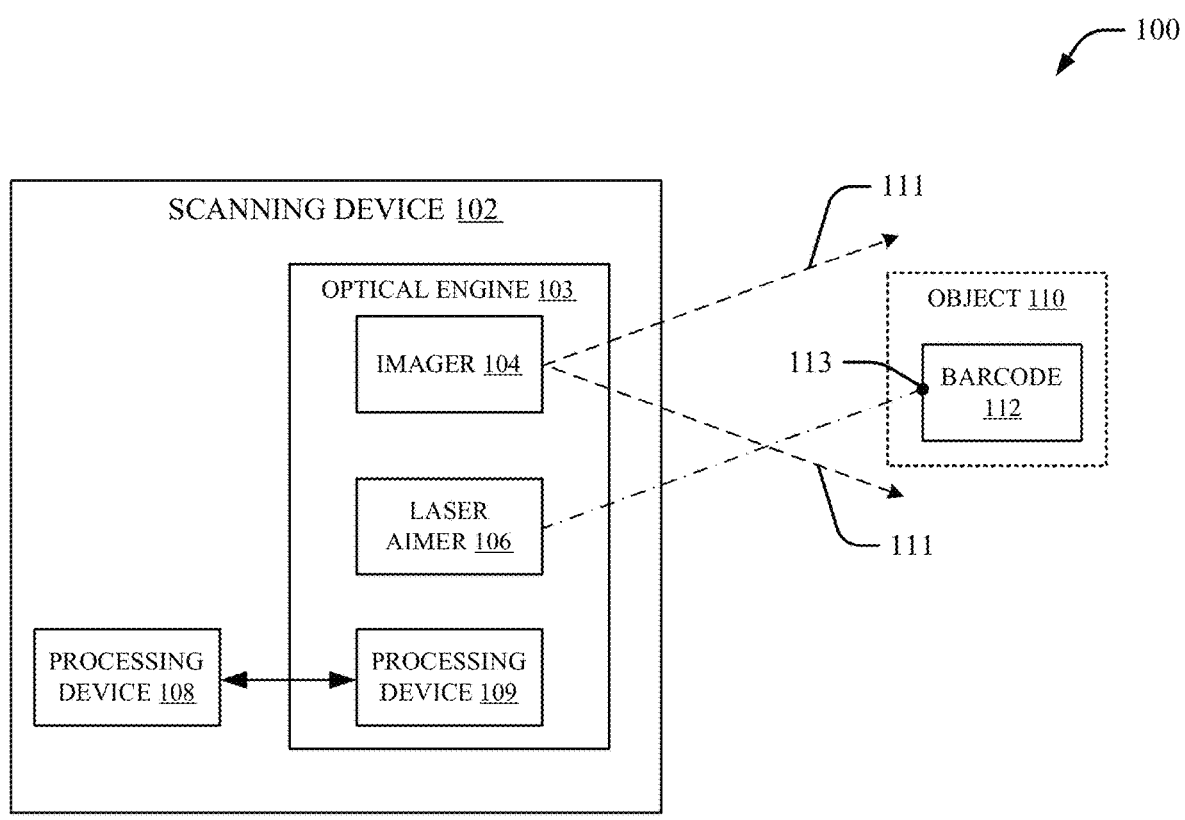
FIG. 1 illustrates a system that provides a scanning device configured for image processing based on laser aimer position, in accordance with one or more embodiments described herein.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Scanning devices such as, for example, barcode scanners or other sensor devices, are often employed in material handling environments such as, for example, distribution centers, shipping centers, warehouses, factories, transportation and logistics environments, etc. Technological advancements have also resulted in the use of data capture devices in other types of environments such as access control for buildings or physical spaces, retail, healthcare, hospitality, etc.

To facilitate data capture via scanning device, a deconvolution process can be performed with respect to images based on a distance between an optical engine and a barcode to be decoded. A suitable filter for the deconvolution process can also be selected based on the distance between the optical engine and the barcode to be decoded. However, computation of the distance between the optical engine and the barcode to be decoded can result in inefficient usage of computing resources, which can increase an amount of time for decoding time and/or can reduce efficiency of the scanning device. Furthermore, errors during the deconvolution process and/or another image process associated with the scanning device can occur. For example, in certain instances, a scanning device may incorrectly identify a noise dot captured by a sensor of the scanning device as a laser aimer pattern (e.g., a laser aimer dot) in the image, resulting in an inaccurate distance between the optical engine and the barcode and/or incorrect selection of a filter for the deconvolution process.

Thus, to address these and/or other issues related to traditional data capture and/or image processing performed by a scanning device, image processing for scanning devices based on laser aimer position is disclosed herein. In various embodiments, the laser aimer position can be identified in a field of view of the scanning device and the identified laser aimer position can be employed to determine a distance between an optical engine of the scanning device and a barcode in the field of view to be decoded. As such, an amount of time to compute the distance between the optical engine and the barcode to be decoded can be reduced and efficiency for image processing by the scanning device can be improved. In various embodiments, an imager of the scanning device can capture multiple image frames of an object present in a field of view of the scanning device. For example, at least a first frame of image data related to an object can be captured with the laser aimer turned on by the scanning device and at least a second frame of image data related to the object can be captured with the laser aimer turned off by the scanning device. The object can include one or more barcodes to be decoded by the scanning device.

In certain embodiments, an absolute value of a difference between two images captured by the imager can be calculated and respective pixel values for respective columns in the two images can be added. Additionally, a pixel column with maximum accumulated pixel values as compared to other pixel columns can be identified as an x-coordinate location for the laser aimer position. In an alternate embodiment, an absolute value of a difference between two images captured by the imager can be calculated and respective pixel values for respective rows in the two images can be added. Additionally, a pixel row with maximum accumulated pixel values as compared to other pixel rows can be identified as a y-coordinate location for the laser aimer position. The x-coordinate location and/or the y-coordinate location of the laser aimer position can then be employed to compute a distance between an optical engine of the scanning device and the object. In various embodiments, the object can include a barcode to be decoded and the distance can be a distance between the optical engine the barcode. In various embodiments, the distance between the optical engine of the scanning device and the object can be employed for image processing associated with the barcode such as, for example, a deconvolution process with respect to the barcode, a decoding process for the barcode, or another type of imaging process with respect to the barcode.

FIG. 1 illustrates a system 100 that provides an exemplary environment within which one or more described features of one or more embodiments of the disclosure can be implemented. The system 100 can be a scanning engine system in a material handling environment such as, for example, a distribution center, a shipping center, a warehouse, a factory, a transportation and logistics environment, or another type of material handling environment. However, it is to be appreciated that the system 100 can be similarly implemented in a different type of environment such as for access control for buildings or physical spaces, retail, healthcare, hospitality, etc. According to an embodiment, the system 100 provides a practical application of image processing with respect to one or more images to facilitate material handling and/or technical applications associated with access control for buildings or physical spaces, retail, healthcare, hospitality, etc.

The system 100 can be related to one or more technologies to facilitate image processing. Moreover, the system 100 can provide an improvement to one or more technologies such as conveyor system technologies, conveyor belt technologies, robotics technologies, sensor systems, material handling technologies, sortation system technologies, mixed stock-keeping unit (SKU) depalletizer technologies, mixed SKU palletizer technologies, industrial technologies, manufacturing technologies, distribution center technologies, warehouse technologies, automation technologies, imaging technologies, asset tracking and monitoring technologies, scanning technologies, digital technologies and/or other technologies.

The system 100 includes a scanning device 102. The scanning device 102 can be a scanner (e.g., a barcode scanner, etc.), a smartphone, a tablet computer, a wearable device, a handheld computing device, an augmented reality device, a virtual reality device, a sensor device, or another type of scanning device capable of capturing imagery. In certain embodiments, the scanning device 102 can be a scan engine device (e.g., a two-dimensional scan engine device or a three-dimensional scan engine device). In one or more embodiments, the scanning device 102 includes an optical engine 103 and a processing device 108. The optical engine 103 includes an imager 104, a laser aimer 106, and/or a processing device 109. The imager 104 can be configured to obtain two or more frames (e.g., two or more image frames) associated with an object 110 within a field of view 111 of the imager 104. In one or more embodiments, the imager 104 and/or the laser aimer 106 can be configured as portions of the optical engine 103 that includes light-generating devices, mirroring elements, electronic components, control components, and/or other components configured to obtain images within the field of view 111. In various embodiments, the processing device 109 of the optical engine 103 can be configured with less processing power and/or a smaller physical size as compared to the processing device 108 of the scanning device 102. For example, the processing device 108 of the scanning device 102 can be configured for image processing related to frames captured by the imager 104. Additionally, the processing device 109 of the optical engine 103 can be configured for one or more calculations associated with the imager 104 and/or the laser aimer 106 that require less processing power than the image processing performed by the processing device 108 of the scanning device 102. The object 110 can be a physical item, a digital item, an element, a device, equipment, or the like. For example, the object 110 can be a package, a parcel, a box, a case, a carton, a pallet, a piece of paper, a digital image, a display screen on a user device, and/or another object.

The object 110 can include at least one barcode 112 to be decoded by the scanning device 102. The laser aimer 106 can be configured to project a laser aimer pattern 113 onto the object 110. For example, the laser aimer 106 can project the laser aimer pattern 113 onto the barcode 112 associated with the object 110. The barcode 112 can represent data in a visual machine-readable format. Additionally, the barcode 112 can be configured as a linear barcode (e.g., a one-dimensional barcode), a 2D barcode, a matrix barcode, a quick response (QR) code, or another type of machine-readable symbol configured to represent data in a visual machine-readable format.

The processing device 108 can be configured to execute one or more computing processes related to data capture and/or image processing performed by the scanning device 102. In various embodiments, the processing device 108 can be configured to perform image processing with respect to barcode 112 based on the laser aimer position 113 determined by the processing device 108. In various embodiments, the processing device 108 can improve performance of the scanning device 102. For example, processing device 108 can provide improved efficiency and/or performance for the scanning device 102, improved handling of objects scanned by the scanning device 102, and/or increased speed of transportation of the objects via a material handling system, as compared to conventional material handling systems. Moreover, by performing image processing with respect to barcode 112 based on the laser aimer position 113 determined by the processing device 108, a number of computing resources employed by the processing device 108 can be reduced.

Figure 2:
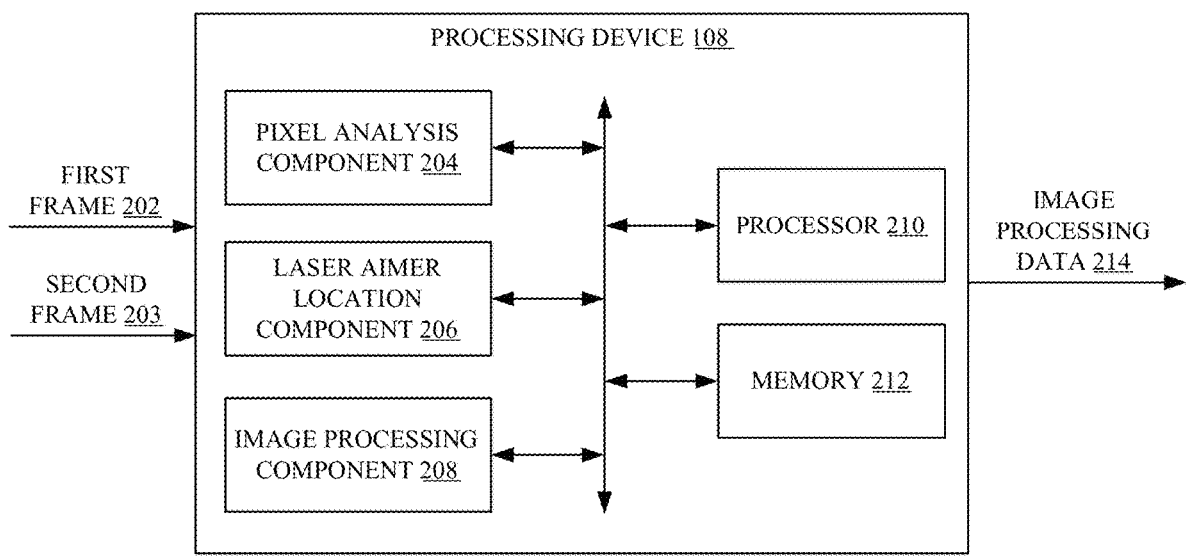
FIG. 2 illustrates an exemplary processing device to provide image processing for scanning devices based on laser aimer position, in accordance with one or more embodiments described herein.

FIG. 2 illustrates an exemplary embodiment of the processing device 108 within which one or more described features of one or more embodiments of the disclosure can be implemented. The processing device 108 can include a pixel analysis component 204, a laser aimer location component 206 and/or an image processing component 208. Additionally, in certain embodiments, the processing device 108 can include a processor 210 and/or a memory 212. In certain embodiments, one or more aspects of the processing device 108 (and/or other systems, apparatuses and/or processes disclosed herein) can constitute executable instructions embodied within a computer-readable storage medium (e.g., the memory 212). For instance, in an embodiment, the memory 212 can store computer executable component and/or executable instructions (e.g., program instructions). Furthermore, the processor 210 can facilitate execution of the computer executable components and/or the executable instructions (e.g., the program instructions). In an example embodiment, the processor 210 can be configured to execute instructions stored in the memory 212 or otherwise accessible to the processor 210.

The processor 210 can be a hardware entity (e.g., physically embodied in circuitry) capable of performing operations according to one or more embodiments of the disclosure. Alternatively, in an embodiment where the processor 210 is embodied as an executor of software instructions, the software instructions can configure the processor 210 to perform one or more algorithms and/or operations described herein in response to the software instructions being executed. In an embodiment, the processor 210 can be a single core processor, a multi-core processor, multiple processors internal to the processing device 108, a remote processor (e.g., a processor implemented on a server), and/or a virtual machine. In certain embodiments, the processor 210 can be in communication with the memory 212, the pixel analysis component 204, the laser aimer location component 206 and/or the image processing component 208 via a bus to, for example, facilitate transmission of data among the processor 210, the memory 212, the pixel analysis component 204, the laser aimer location component 206 and/or the image processing component 208. The processor 210 can be embodied in a number of different ways and can, in certain embodiments, include one or more processing devices configured to perform independently. Additionally, or alternatively, the processor 210 can include one or more processors configured in tandem via a bus to enable independent execution of instructions, pipelining of data, and/or multi-thread execution of instructions. The memory 212 can be non-transitory and can include, for example, one or more volatile memories and/or one or more non-volatile memories. In other words, for example, the memory 212 can be an electronic storage device (e.g., a computer-readable storage medium). The memory 212 can be configured to store information, data, content, one or more applications, one or more instructions, or the like, to enable the processing device 108 to carry out various functions in accordance with one or more embodiments disclosed herein. As used herein in this disclosure, the term "component," "system," "device," and the like, can be and/or can include a computer-related entity. For instance, "a component," "a system," "a device," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The processing device 108 (e.g., the pixel analysis component 204 of the processing device 108) can receive a first frame 202 and a second frame 203. The first frame 202 and the second frame 203 can be image frames of image data captured by the scanning device 102. For example, the first frame 202 and the second frame 203 can be image frames of image data captured by the imager 104 of the scanning device 102. The first frame 202 and the second frame 203 can be encoded and/or represented in one or more formats such as JPEG, Bitmap, PNG, RAW, and/or another type of data format. The first frame 202 and the second frame 203 can also respectively include a set of pixels configured as groupings of pixels. For example, the first frame 202 can include a first set of pixels arranged in a set of pixel columns and/or a set of pixel rows. Additionally, the second frame 203 can include a second set of pixels arranged in a set of pixel columns and/or a set of pixel rows. In various embodiments, respective pixels included in the first frame 202 and/or the second frame 203 can correspond to respective electrical signals processed by the scanning device 102 (e.g., the imager 104 of the scanning device 102). In one or more embodiments, the scanning device 102 (e.g., the imager 104 of the scanning device 102) can capture the first frame 202 using the laser aimer pattern 113 via the laser aimer 106. Furthermore, the scanning device 102 (e.g., the imager 104 of the scanning device 102) can capture the second frame 203 without using the laser aimer pattern 113.

The pixel analysis 204 can analyze the respective set of pixels for the first frame 202 and the second frame 203 to facilitate image processing with respect to barcode 112. In an embodiment, the pixel analysis component 204 can compute a difference between first pixel data associated with the first frame 202 and second pixel data associated with the second frame 203. The first pixel data can be for a first grouping of pixels associated with the first frame 202 and the second pixel data can be for a second grouping of pixels associated with the second frame 203. The first grouping of pixels can correspond to one or more pixel columns and/or one or more pixels rows of the first frame 202. The second grouping of pixels can correspond to one or more pixel columns and/or one or more pixels rows of the second frame 203.

Additionally, the laser aimer location component 206 can determine a location of the laser aimer pattern 113 in the first frame 202 (or the second frame 203) based on a comparison between respective differences between the first pixel data for the first grouping of pixels and the second pixel data for the second grouping of pixels. The laser aimer location component 206 can also compute a distance between the optical engine 103 and the object 110 based on the location of the laser aimer pattern 113 within the first frame 202 (or the second frame 203. In certain embodiments, the laser aimer location component 206 can determine the location of the laser aimer pattern in the first frame 202 (or the second frame 203) based on an absolute value of the difference between the first pixel data associated with the first frame 202 and the second pixel data associated with the second frame 203.

In certain embodiments, the first grouping of pixels is a first pixel column associated with the first frame 202 and the second grouping of pixels is a second pixel column associated with the second frame 203. The laser aimer location component 206 can compute a difference between respective pixel values in the first pixel column and other respective pixel values in the second pixel column to determine a pixel column associated with pixel difference values. The laser aimer location component 206 can also add the pixel difference values associated with the pixel column to determine the location of the laser aimer pattern 113. For example, the laser aimer location component 206 can add the pixel difference values associated with the pixel column to determine an x-coordinate of the laser aimer pattern 113. In certain embodiments, the first grouping of pixels is a first pixel row associated with the first frame 202 and the second grouping of pixels is a second pixel row associated with the second frame 203. The laser aimer location component 206 can compute a difference between respective pixel values in the first pixel row and other respective pixel values in the second pixel row to determine a pixel row associated with pixel difference values. For example, the laser aimer location component 206 can add the pixel difference values associated with the pixel row to determine a y-coordinate of the laser aimer pattern 113. In certain embodiments, the laser aimer location component 206 can also add the pixel difference values associated with the pixel row to determine the location of the laser aimer pattern 113.

The image processing component 208 can perform image processing with respect to the barcode 112 based on the distance between the imager 104 and the object 110. The image processing component 208 can also generate image processing data 214 related to the image processing. In an embodiment, the image processing can include a deconvolutional process with respect to the image 202 or the image 203. For example, the image processing component 208 can perform a deconvolutional process with respect to the image 202 or the image 203 based on the distance between the imager 104 and the object 110. One or more portions of the image processing data 214 can include data associated with the deconvolutional process. Additionally or alternatively, in an embodiment, the image processing can include a decoding of the barcode 112 included in the image 202 or the image 203. For example, the image processing component 208 can decode the barcode 112 included in the image 202 or the image 203 based on the distance between the imager 104 and the object 110. One or more portions of the image processing data 214 can additionally or alternatively include data associated with the decoding. In certain embodiments, the image processing component 208 can select a filter for the image processing based on the distance between the imager 104 and the object 110. In certain embodiments, image processing component 208 can select a filter for a deconvolutional process of the image processing based on the distance between the imager 104 and the object 110. One or more portions of the image processing data 214 can include a filter identifier and/or other filter data associated with the filter selected for the deconvolutional process. In certain embodiments, to facilitate the image processing (e.g., the deconvolutional process and/or the decoding of the barcode 112), the image processing component 208 can select the barcode 112 from a plurality of barcodes on the object 110.

Figure 3:
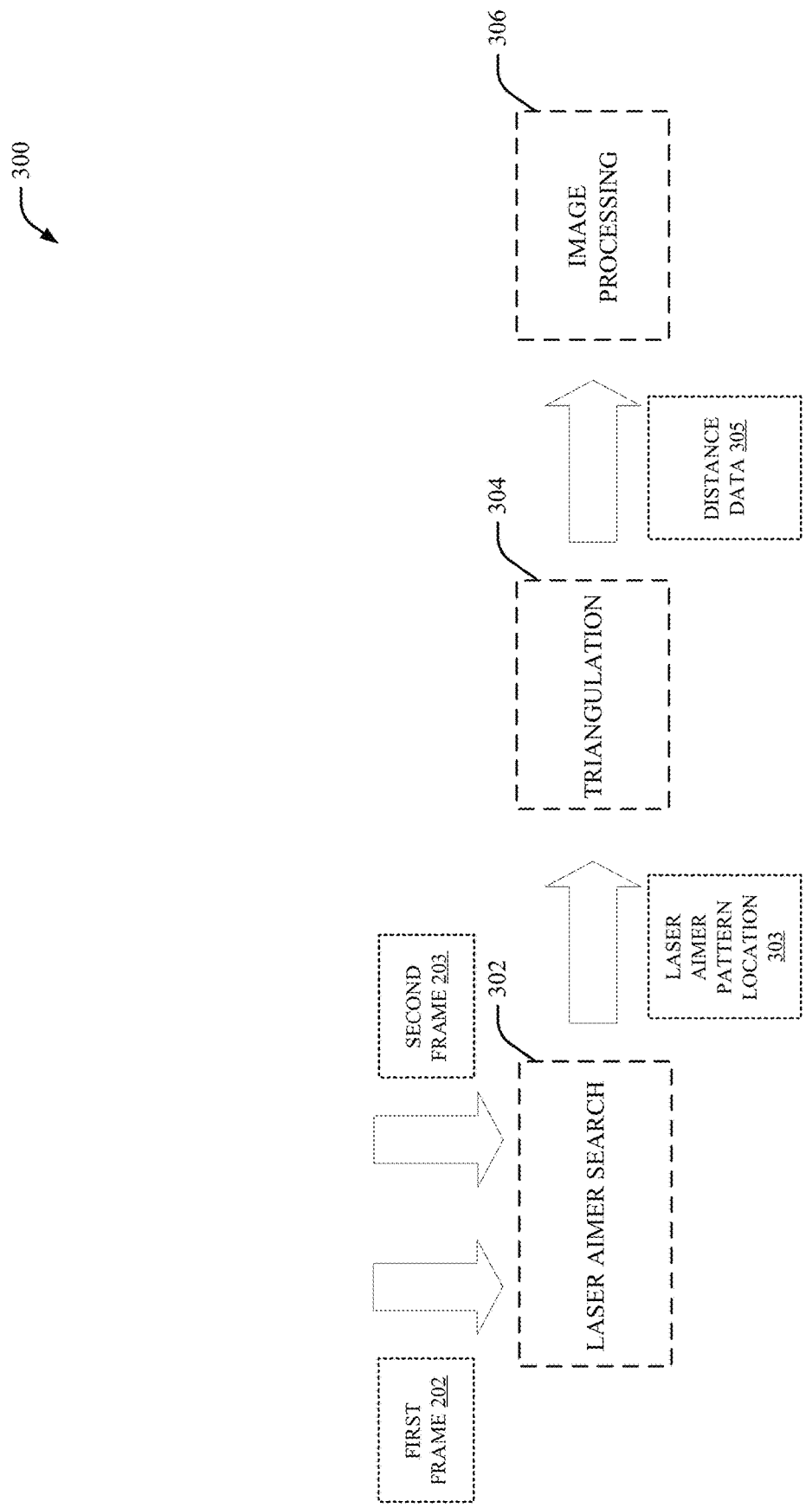
FIG. 3 illustrates a system related to image processing for scanning devices, in accordance with one or more embodiments described herein.

FIG. 3 illustrates a system 300 related to image processing for scanning devices according to one or more embodiments of the disclosure. The system 300 includes a process 302 associated with a laser aimer search. The process 302 can be performed by the processing device 108 of the scanning device. For example, in various embodiments, the process 302 can include one or more processes performed by the pixel analysis component 204 and/or the laser aimer location component 206. The process 302 can be configured to determine a laser aimer pattern location 303 based on laser aimer search processing with respect to the first frame 202 and the second frame 203. In various embodiments, the scanning device 102 can generate the first frame 202 and the second frame 203. For example, the process 302 can compute a difference between first pixel data for the first frame 202 (e.g., first pixel data for a first grouping of pixels associated with the first frame 202) and second pixel data for the second frame 203 (e.g., second pixel data for a second grouping of pixels associated with the second frame 203). Additionally, the process 302 can determine the laser aimer pattern location 303 based on a comparison between respective differences between the first pixel data for the first frame 202 and the second pixel data for the second frame 203. The laser aimer pattern location 303 can be a location of a laser aimer pattern in the first frame 202 or the second frame 203. The laser aimer pattern can be generated by the laser aimer 106 during capture of the first frame 202 and/or the second frame 203.

Figure 4:
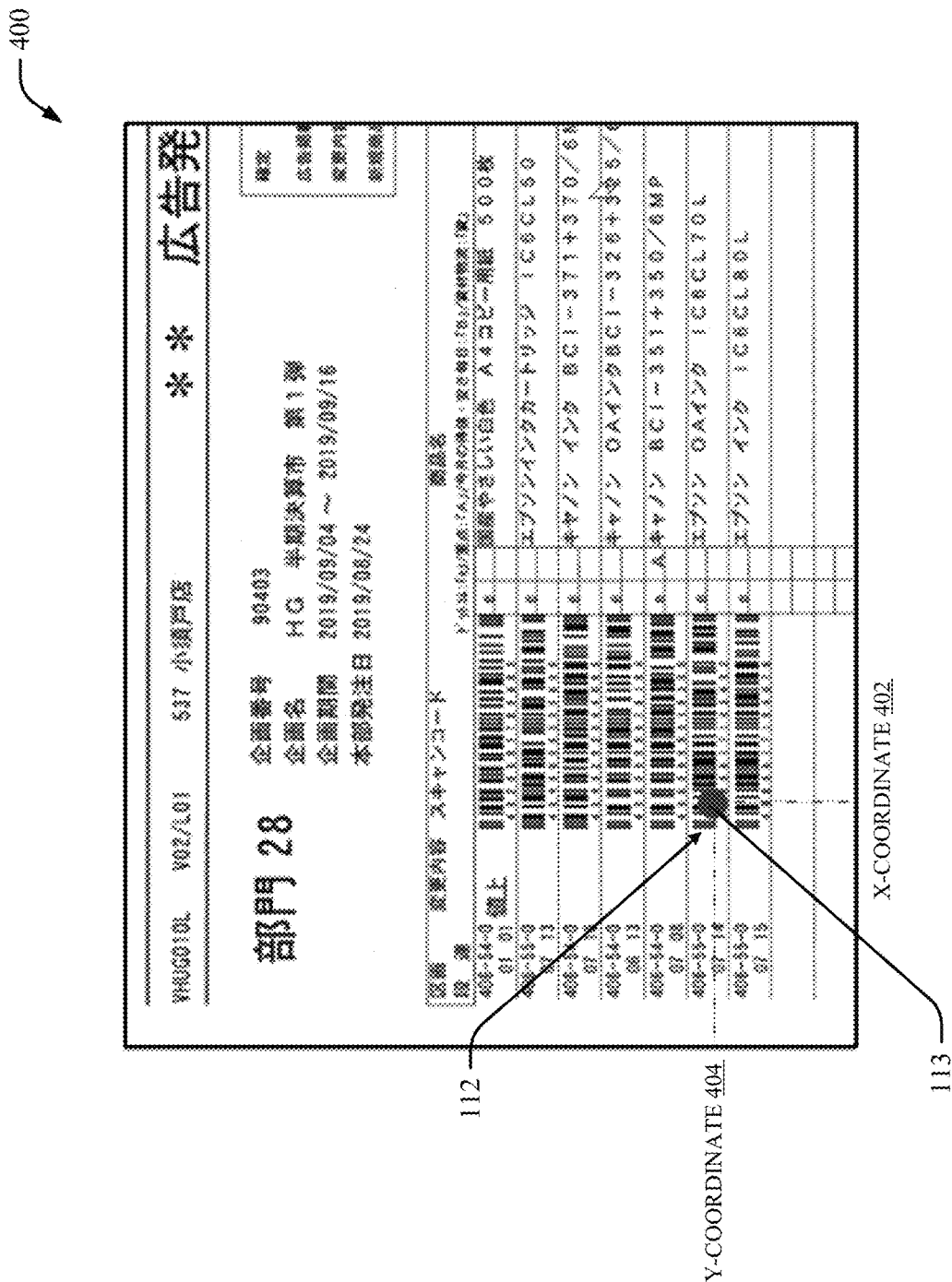
FIG. 4 illustrates an exemplary image, in accordance with one or more embodiments described herein.

FIG. 4 illustrates an image 400 according to one or more embodiments of the disclosure. The image 400 can be an image captured by the scanning device 102. For example, the image 400 can be an image captured by the imager 104 of the scanning device 102. The image 400 can be encoded and/or represented in one or more formats such as JPEG, Bitmap, PNG, RAW, and/or another type of data format. The image 400 can also respectively include a set of pixels configured as a grouping of pixels. For example, the image 400 can include a set of pixels arranged in a set of pixel columns and/or a set of pixel rows. In one or more embodiments, the scanning device 102 (e.g., the imager 104 of the scanning device 102) can capture the image 400 using the laser aimer pattern 113 via the laser aimer 106. For instance, the image 400 can include the barcode 112 and the laser aimer pattern 113 employed by the laser aimer 106 to locate and/or identify the barcode 112. In this regard, in one or more embodiments, the image 400 can correspond to the first frame 202. The laser aimer pattern 113 included in the image 400 can be associated with an x-coordinate 402 and a y-coordinate 404. The x-coordinate 402 and a y-coordinate 404 can correspond to a location of the laser aimer pattern 113 (e.g., the laser aimer pattern location 303). For example, the x-coordinate 402 and a y-coordinate 404 can correspond to a pixel location with respect to a set of pixels arranged in the set of pixel columns and/or the set of pixel rows.

Figure 5:
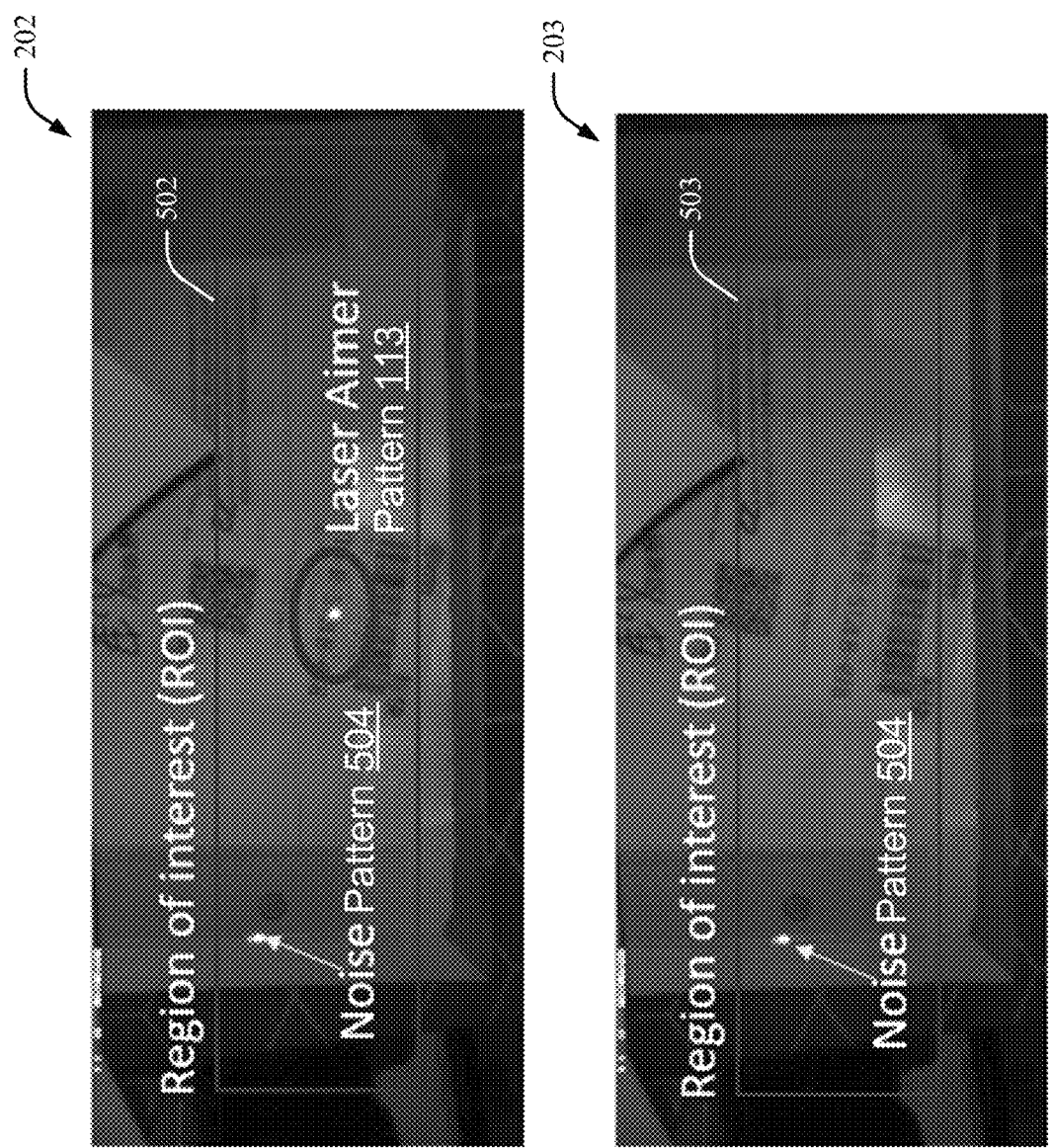
FIG. 5 illustrates an exemplary first frame and an exemplary second frame, in accordance with one or more embodiments described herein.

FIG. 5 illustrates the first frame 202 and the second frame 203 according to one or more embodiments of the disclosure. The first frame 202 and the second frame 203 can be images captured by the scanning device 102. In one or more embodiments, the processing device 108 (e.g., the pixel analysis component 204) can determine a region of interest 502 for the first frame 202 based on the laser aimer pattern 113 and/or a noise pattern 504 included in the first frame 202. The noise pattern 504 can be a noise dot (e.g., a sensor noise pattern) in the first frame 202. For example, the noise pattern 504 can be a false laser aimer pattern in the first frame 202 that is generated during capture of the first frame 202 due to, for example, sensor noise and/or sensor inaccuracies associated with the imager 104. The region of interest 502 can correspond to the first set of pixels configured as a first grouping of pixels. For example, the region of interest 502 can include a first set of pixel columns and a first set of pixel rows.

The processing device 108 (e.g., the pixel analysis component 204) can also determine a region of interest 503 for the first frame 203 based on the region of interest 502. The region of interest 503 can include, for example, the noise pattern 504. The region of interest 503 can correspond to the second set of pixels configured as a second grouping of pixels. For example, the region of interest 503 can include a second set of pixel columns and a second set of pixel rows. In one or more embodiments, dimensionality of the region of interest 503 (e.g., a number of pixel columns, a number of pixel rows, and/or a total number of pixels) can correspond to dimensionality of the region of interest 502.

Figure 6:
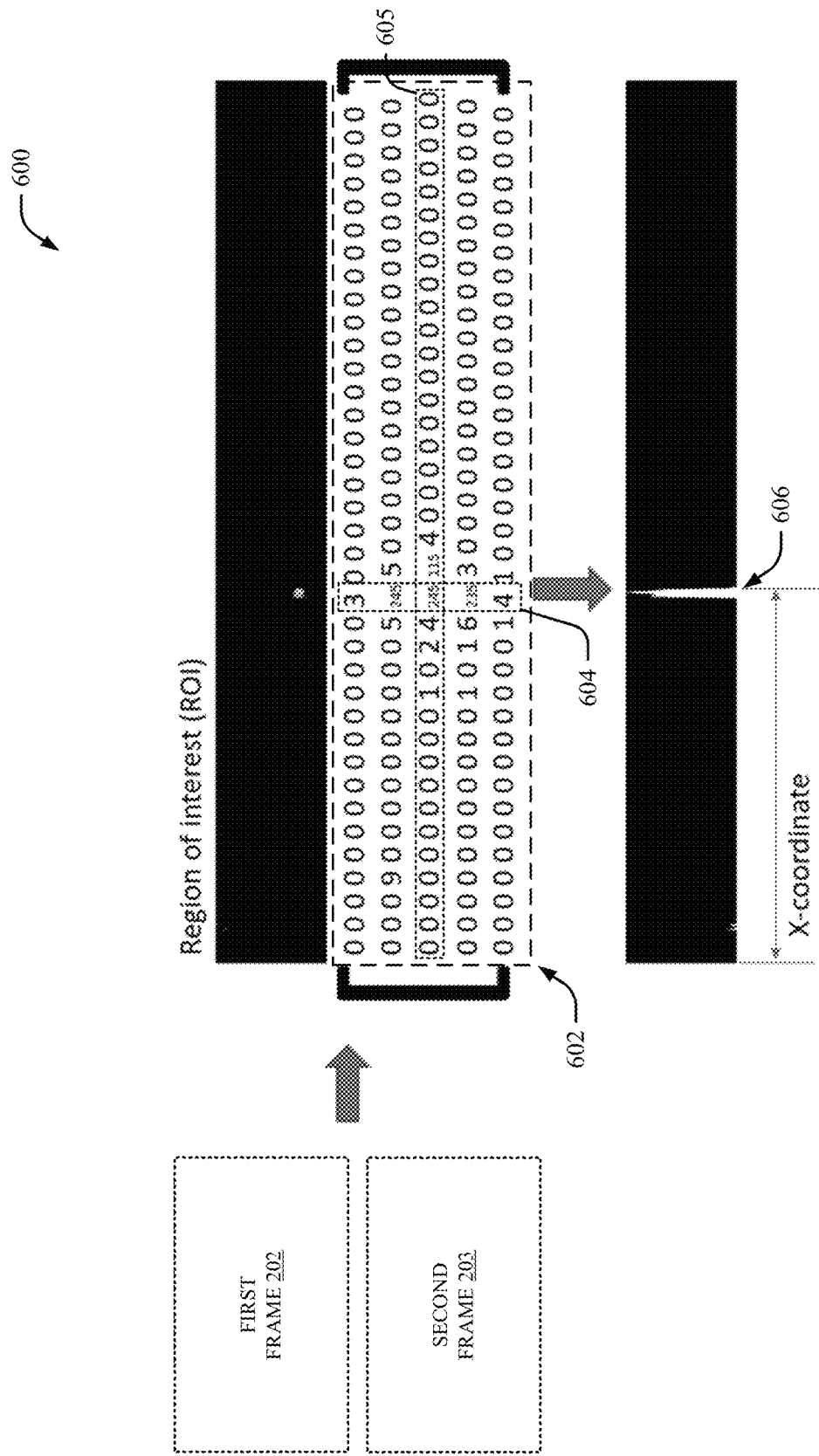
FIG. 6 illustrates a system associated with a laser aimer search, in accordance with one or more embodiments described herein.

FIG. 6 illustrates a system 600 associated with a laser aimer search according to one or more embodiments of the disclosure. The system 600 includes a region of interest comparison 602. The region of interest comparison 602 can be determined based on differences between respective pixels of the first frame 202 and the second frame 203. For example, the region of interest comparison 602 can be determined based an absolute value of differences between respective pixels of the first frame 202 and the second frame 203. The region of interest comparison 602 can represent a set of pixels (e.g., a set of pixel difference values) configured as a grouping of pixels (e.g., a grouping of pixel difference values). For example, the region of interest comparison 602 can include a set of pixels arranged in a set of pixel columns and a set of pixel rows. In an aspect, the region of interest comparison 602 can include a grouping of pixels 606 arranged as a pixel column. The grouping of pixels 606 can include a first pixel (e.g., a first pixel difference value) equal to "3", a second pixel (e.g., a second pixel difference value) equal to "245", a third pixel (e.g., a third pixel difference value) equal to "245", a fourth pixel (e.g., a fourth pixel difference value) equal to "235", and a fifth pixel (e.g., a fifth pixel difference value) equal to "4". For example, the first pixel in the grouping of pixels 606 can represent an absolute value of a difference between a corresponding pixel in the first frame 202 and a corresponding pixel in the second frame 203, the second pixel in the grouping of pixels 606 can represent another absolute value of another difference between another corresponding pixel in the first frame 202 and another corresponding pixel in the second frame 203, etc. In one or more embodiments, the pixel values in the grouping of pixels 606 can be added to determine an x-coordinate value. In an example, the pixel values in the grouping of pixels 606 can be a maximum accumulated value 606 with respect to other pixel values for other column grouping of pixels in the region of interest comparison 602 and therefore can be identified as the x-coordinate location for the laser aimer pattern 113.

Additionally, or alternatively, the region of interest comparison 602 can include a grouping of pixels 605 arranged as a row of pixels. The grouping of pixels 605 can include respective pixels that represent an absolute value of a difference between a corresponding pixel in the first frame 202 and a corresponding pixel in the second frame 203. In one or more embodiments, the pixel values in the grouping of pixels 605 can be added to determine a y-coordinate value. In an example, the pixel values in the grouping of pixels 605 can be a maximum accumulated value with respect to other pixel values for other row grouping of pixels in the region of interest comparison 602 and therefore can be identified as the y-coordinate location for the laser aimer pattern 113. In one or more embodiments, the processing device 108 (e.g., the laser aimer location component 206) can identify the location of the laser aimer pattern 113 (e.g., the laser aimer pattern location 303) as the x-coordinate value and/or the y-coordinate value.

Returning back to FIG. 3, the system 300 also includes a process 304 associated with a triangulation. The process 304 can be performed by the processing device 108 of the scanning device. For example, in various embodiments, the process 304 can include one or more processes performed by the laser aimer location component 206. The process 304 can employ the laser aimer pattern location 303 to determine distance data 305. The distance data 305 can include, for example, a distance between the optical engine 103 and the object 110. The process 304 can determined the distance data 305 based on the laser aimer pattern location 303. The triangulation performed by the process 304 can be associated with a triangulation computation between the imager 104, the laser aimer 106, and the object 110.

Figure 7:
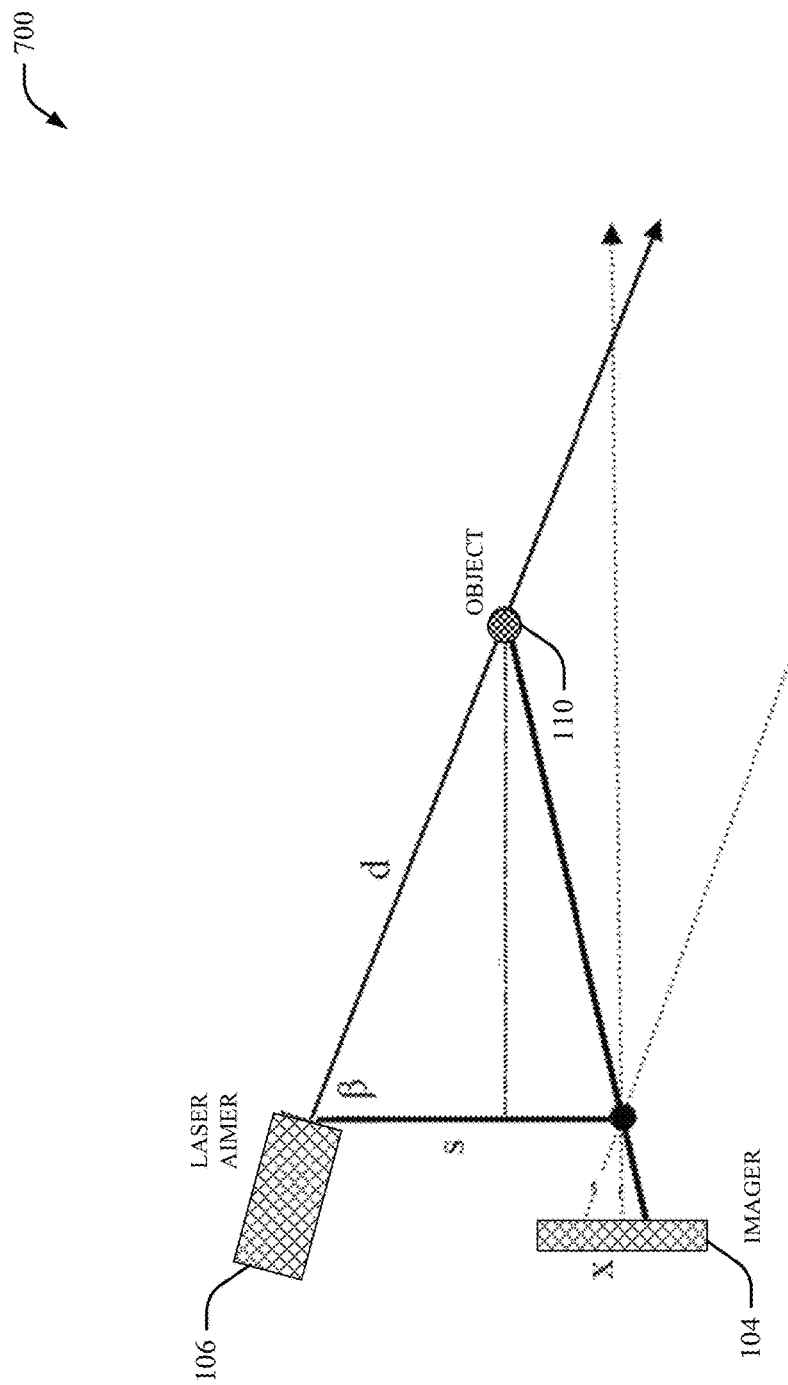
FIG. 7 illustrates a system associated with triangulation, in accordance with one or more embodiments described herein.

FIG. 7 illustrates a system 700 associated with triangulation according to one or more embodiments of the disclosure. The system 700 includes the imager 104, the laser aimer 106, and the object 110. In one or more embodiments, the process 304 can employ the following equation to compute the distance between the optical engine 103 and the object 110:

$$d = \frac{f \cdot s}{X \sin\beta}$$

where d is the distance between the optical engine 103 and the object 110, X is a location (e.g., an x-coordinate and/or a y-coordinate) of the laser aimer pattern 113, s is a distance between the imager 104 and the laser aimer 106, and $\beta$ is an angle between d and s. The distance data 305 can include, for example, the X value employed to determine d. In various embodiments, the process 304 can employ a predefined data structure (e.g., a predefined table) that indexes d with respect to X to determine the distance between the optical engine 103 and the object 110 based on the distance data 305. In various embodiments, the distance s can be defined based on a structure of the optical engine 103 (e.g., a structure of the scanning device 102).

Returning back to FIG. 3, the system 300 also includes a process 306 associated with image processing. The process 306 can be performed by the processing device 108 of the scanning device. For example, in various embodiments, the process 306 can include one or more processes performed by the image processing component 208. The process 306 can employ the distance data 305 for image processing. For instance, in an embodiment, the process 306 can employ the distance data 305 to decode the barcode 112 based on the distance data 305. In another embodiment, the process 306 can employ the distance data 305 to perform a deconvolutional process with respect to the barcode 112 based on the distance data 305. In another embodiment, the process 306 can employ the distance data 305 to select a filter for the image processing and/or the deconvolutional process based on the distance data 305.

Figure 8:
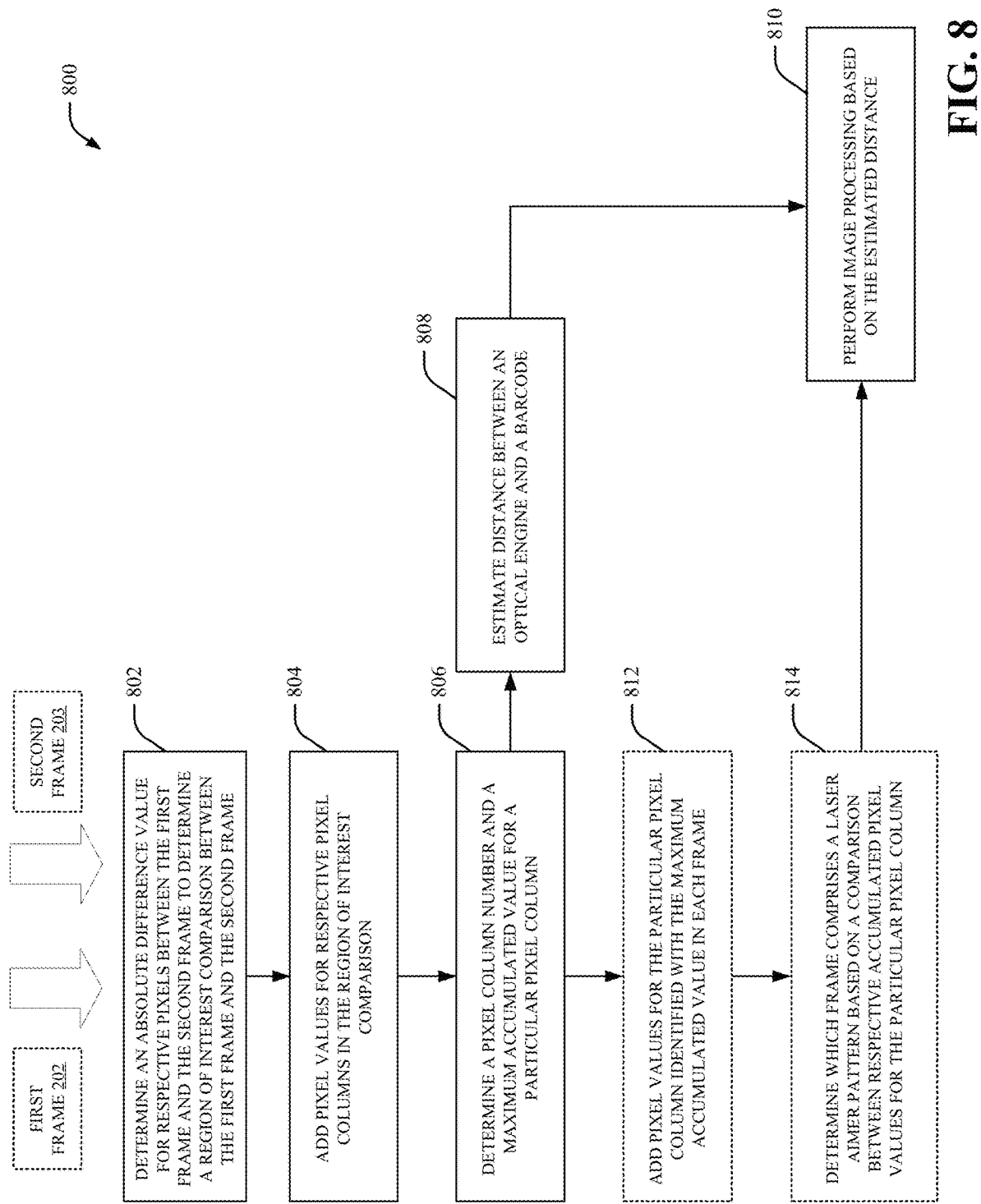
FIG. 8 illustrates a flow diagram for performing a laser aimer position search, in accordance with one or more embodiments described herein.

FIG. 8 illustrates a computer-implemented method 800 for performing a laser aimer position search in accordance with one or more embodiments described herein. The computer-implemented method 800 can be performed by the processing device 108, for example. In one or more embodiments, the computer-implemented method 800 begins at step 802 that determines an absolute difference value for respective pixels between the first frame (e.g., the first frame 202) and the second frame (e.g., the second frame 203) to determine a region of interest comparison between the first frame and the second frame. The computer-implemented method 800 also includes a step 804 that adds pixel values for respective pixel columns in the region of interest comparison. The computer-implemented method 800 also includes a step 806 that determines a pixel column number and a maximum accumulated value for a particular pixel column. The pixel column number can correspond to an x-coordinate location. The computer-implemented method 800 also includes a step 808 that estimates a distance between an optical engine and a barcode. For example, the distance between the optical engine and the barcode can be estimated based on the pixel column number (e.g., the x-coordinate location) with the maximum accumulated value with respect to other pixel column numbers.

In certain embodiments, the computer-implemented method 800 can additionally include a step 812 that adds pixel value for the particular pixel column identified with the maximum accumulated value in each frame. For example, an accumulated value for pixel values for the particular pixel column identified as the maximum accumulated value can be determined for the first frame 202. Additionally, an accumulated value for pixel values for the particular pixel column identified as the maximum accumulated value can also be determined for the second frame 203. In certain embodiments, the computer-implemented method 800 can additionally include a step 814 that determines which frame comprises a laser aimer pattern based on a comparison between respective accumulated pixel values for the particular pixel column. For example, the accumulated value for the pixel values associated with the first frame 202 can be compared to the accumulated value for the pixel values associated with the second frame 203 to determine the frame that comprises the laser aimer pattern. In certain embodiments, the frame determined to comprise the laser aimer pattern can be selected as the frame for the image processing performed based on the estimated distance.

Figure 9:
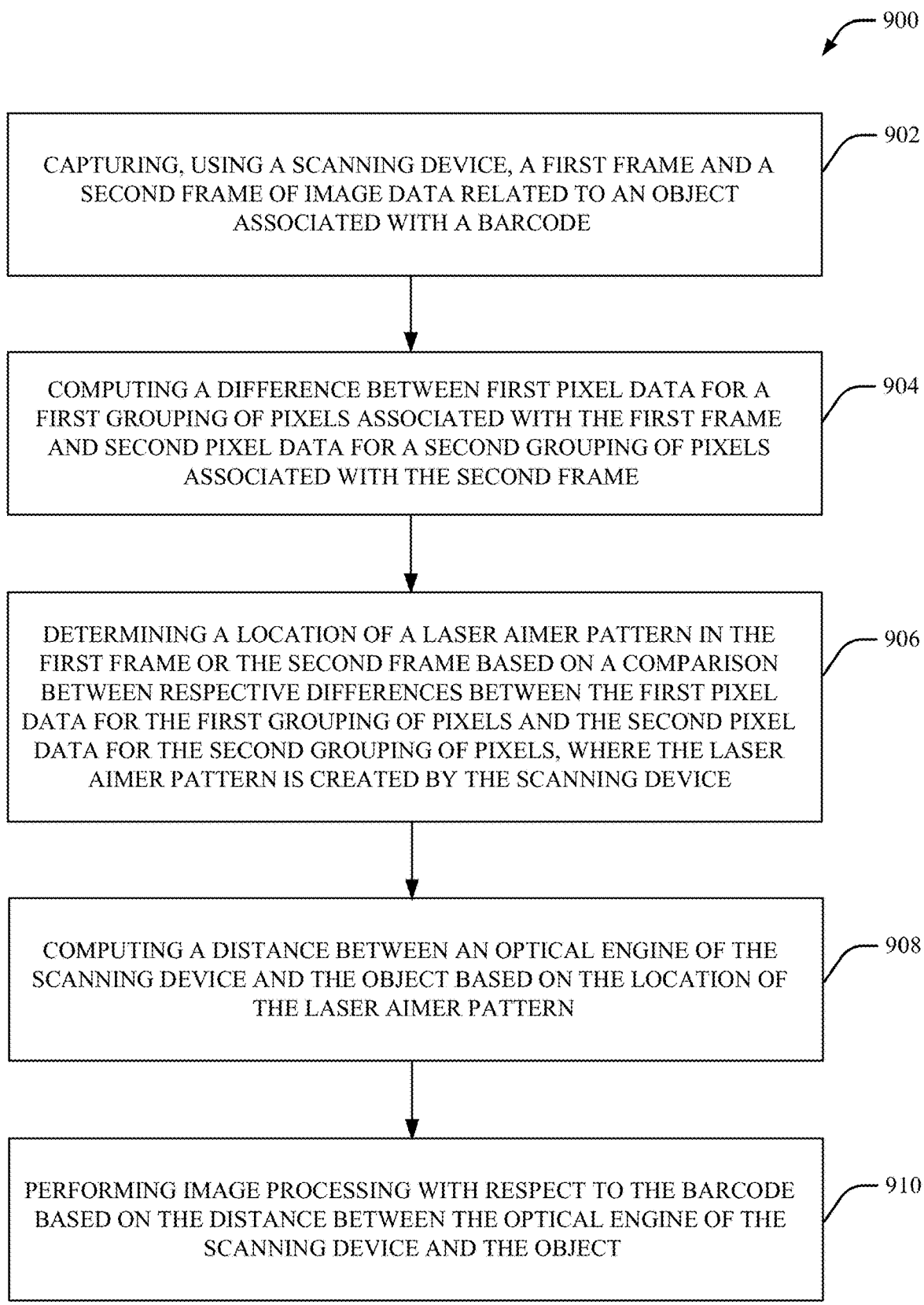
FIG. 9 illustrates a flow diagram for image processing for scanning devices based on laser aimer position, in accordance with one or more embodiments described herein.

FIG. 9 illustrates a computer-implemented method 900 for image processing for scanning devices based on laser aimer position in accordance with one or more embodiments described herein. The computer-implemented method 900 can be associated with the processing device 108, for example. In one or more embodiments, the computer-implemented method 900 begins with capturing, using a scanning device, a first frame and a second frame of image data related to an object associated with a barcode (block 902).

The computer-implemented method 900 further includes computing a difference between first pixel data for a first grouping of pixels associated with the first frame and second pixel data for a second grouping of pixels associated with the second frame (block 904).

The computer-implemented method 900 further includes determining a location of a laser aimer pattern in the first frame or the second frame based on a comparison between respective differences between the first pixel data for the first grouping of pixels and the second pixel data for the second grouping of pixels, where the laser aimer pattern is created by the scanning device (block 906).

In certain embodiments, the first grouping of pixels is a first pixel column associated with the first frame and the second grouping of pixels is a second pixel column associated with the second frame. Additionally, in certain embodiments, the computer-implemented method 900 further computing a difference between respective pixel values in the first pixel column and other respective pixel values in the second pixel column to determine a pixel column associated with pixel difference values. In certain embodiments, the computer-implemented method 900 includes adding the pixel difference values to determine the location of the laser aimer pattern.

In certain embodiments, the first grouping of pixels is a first pixel row associated with the first frame and the second grouping of pixels is a second pixel row associated with the second frame. Additionally, in certain embodiments, the computer-implemented method 900 includes computing a difference between respective pixel values in the first pixel row and other respective pixel values in the second pixel row to determine a pixel row associated with pixel difference values. In certain embodiments, the computer-implemented method 900 includes adding the pixel difference values to determine the location of the laser aimer pattern.

In certain embodiments, the determining the location of the laser aimer pattern the first frame or the second frame comprises determining the location of the laser aimer pattern in the first frame or the second frame based on an absolute value of the difference between the first pixel data associated with the first frame and the second pixel data associated with the second frame.

The computer-implemented method 900 further includes computing a distance between an optical engine of the scanning device and the object based on the location of the laser aimer pattern (block 908).

The computer-implemented method 900 further includes performing image processing with respect to the barcode based on the distance between the optical engine of the scanning device and the object (block 910).

In certain embodiments, the computer-implemented method 900 includes capturing the first frame using the laser aimer pattern. In certain embodiments, the computer-implemented method 900 includes capturing the second frame without using the laser aimer pattern. In certain embodiments, the computer-implemented method 900 includes performing the image processing with respect to the barcode included in the first frame associated with the laser aimer pattern.

In certain embodiments, the computer-implemented method 900 includes decoding the barcode based on the distance between the optical engine of the scanning device and the object.

In certain embodiments, the computer-implemented method 900 includes selecting a filter for the image processing based on the distance between the optical engine of the scanning device and the object.

In certain embodiments, the computer-implemented method 900 includes selecting a filter for a deconvolutional process of the image processing based on the distance between the optical engine of the scanning device and the object.

In certain embodiments, the computer-implemented method 900 includes selecting the barcode from a plurality of barcodes on the object and/or selecting a filter for the image processing with respect to the barcode based on the distance between the optical engine of the scanning device and the object.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A system, comprising:
a processor; and
a memory that stores executable instructions that, when executed by the processor, cause the processor to:
capture, using a scanning device, a first frame and a second frame of image data related to an object associated with a barcode;
compute a difference between first pixel data for a first grouping of pixels associated with the first frame and second pixel data for a second grouping of pixels associated with the second frame;
determine a location of a laser aimer pattern in the first frame or the second frame based on a comparison between respective differences between the first pixel data for the first grouping of pixels and the second pixel data for the second grouping of pixels, wherein the laser aimer pattern is created by the scanning device;
compute a distance between an optical engine of the scanning device and the object based on the location of the laser aimer pattern; and
perform image processing with respect to the barcode based on the distance between the optical engine of the scanning device and the object.

2. The system of claim 1, wherein the first grouping of pixels is a first pixel column associated with the first frame, wherein the second grouping of pixels is a second pixel column associated with the second frame, and wherein the executable instructions further cause the processor to:
compute a difference between respective pixel values in the first pixel column and other respective pixel values in the second pixel column to determine a pixel column associated with pixel difference values; and
add the pixel difference values to determine the location of the laser aimer pattern.

3. The system of claim 1, wherein the first grouping of pixels is a first pixel row associated with the first frame, wherein the second grouping of pixels is a second pixel row associated with the second frame, and wherein the executable instructions further cause the processor to:

compute a difference between respective pixel values in the first pixel row and other respective pixel values in the second pixel row to determine a pixel row associated with pixel difference values; and
add the pixel difference values to determine the location of the laser aimer pattern.

4. The system of claim 1, wherein the executable instructions further cause the processor to:
determine the location of the laser aimer pattern in the first frame or the second frame based on an absolute value of the difference between the first pixel data associated with the first frame and the second pixel data associated with the second frame.

5. The system of claim 1, wherein the executable instructions further cause the processor to:
capture the first frame using the laser aimer pattern;
capture the second frame without using the laser aimer pattern; and
perform the image processing with respect to the barcode included in the first frame associated with the laser aimer pattern.

6. The system of claim 1, wherein the executable instructions further cause the processor to:
decode the barcode based on the distance between the optical engine of the scanning device and the object.

7. The system of claim 1, wherein the executable instructions further cause the processor to:
select a filter for the image processing based on the distance between the optical engine of the scanning device and the object.

8. The system of claim 1, wherein the executable instructions further cause the processor to:
select a filter for a deconvolutional process of the image processing based on the distance between the optical engine of the scanning device and the object.

9. The system of claim 1, wherein the executable instructions further cause the processor to:
select the barcode from a plurality of barcodes on the object; and
select a filter for the image processing with respect to the barcode based on the distance between the optical engine of the scanning device and the object.

10. A method, comprising:
capturing, using a scanning device, a first frame and a second frame of image data related to an object associated with a barcode;
computing a difference between first pixel data for a first grouping of pixels associated with the first frame and second pixel data for a second grouping of pixels associated with the second frame;
determining a location of a laser aimer pattern in the first frame or the second frame based on a comparison between respective differences between the first pixel data for the first grouping of pixels and the second pixel data for the second grouping of pixels, wherein the laser aimer pattern is created by the scanning device;
computing a distance between an optical engine of the scanning device and the object based on the location of the laser aimer pattern; and
performing image processing with respect to the barcode based on the distance between the optical engine of the scanning device and the object.

11. The method of claim 10, wherein the first grouping of pixels is a first pixel column associated with the first frame, wherein the second grouping of pixels is a second pixel column associated with the second frame, and the method further comprising:

computing a difference between respective pixel values in the first pixel column and other respective pixel values in the second pixel column to determine a pixel column associated with pixel difference values; and adding the pixel difference values to determine the location of the laser aimer pattern.

12. The method of claim 10, wherein the first grouping of pixels is a first pixel row associated with the first frame, wherein the second grouping of pixels is a second pixel row associated with the second frame, and the method further comprising:

computing a difference between respective pixel values in the first pixel row and other respective pixel values in the second pixel row to determine a pixel row associated with pixel difference values; and adding the pixel difference values to determine the location of the laser aimer pattern.

13. The method of claim 10, wherein the determining the location of the laser aimer pattern in the first frame or the second frame comprises determining the location of the laser aimer pattern in the first frame or the second frame based on an absolute value of the difference between the first pixel data associated with the first frame and the second pixel data associated with the second frame.

14. The method of claim 10, further comprising:

capturing the first frame using the laser aimer pattern; and capturing the second frame without using the laser aimer pattern, and the performing the image processing comprising performing the image processing with respect to the barcode included in the first frame associated with the laser aimer pattern.

15. The method of claim 10, wherein the performing the image processing comprises decoding the barcode based on the distance between the optical engine of the scanning device and the object.

16. A computer program product comprising at least one computer-readable storage medium having program instructions embodied thereon, the program instructions executable by a processor to cause the processor to:

capture, using a scanning device, a first frame and a second frame of image data related to an object associated with a barcode;

compute a difference between first pixel data for a first grouping of pixels associated with the first frame and second pixel data for a second grouping of pixels associated with the second frame;

determine a location of a laser aimer pattern in the first frame or the second frame based on a comparison between respective differences between the first pixel data for the first grouping of pixels and the second pixel data for the second grouping of pixels, wherein the laser aimer pattern is created by the scanning device;

compute a distance between an optical engine of the scanning device and the object based on the location of the laser aimer pattern; and perform image processing with respect to the barcode based on the distance between the optical engine of the scanning device and the object.

17. The computer program product of claim 16, wherein the first grouping of pixels is a first pixel column associated with the first frame, wherein the second grouping of pixels is a second pixel column associated with the second frame, and wherein the program instructions are further executable by the processor to cause the processor to:

compute a difference between respective pixel values in the first pixel column and other respective pixel values in the second pixel column to determine a pixel column associated with pixel difference values; and add the pixel difference values to determine the location of the laser aimer pattern.

18. The computer program product of claim 16, wherein the first grouping of pixels is a first pixel row associated with the first frame, wherein the second grouping of pixels is a second pixel row associated with the second frame, and wherein the program instructions are further executable by the processor to cause the processor to:

compute a difference between respective pixel values in the first pixel row and other respective pixel values in the second pixel row to determine a pixel row associated with pixel difference values; and add the pixel difference values to determine the location of the laser aimer pattern.

19. The computer program product of claim 16, wherein the program instructions are further executable by the processor to cause the processor to:

determine the location of the laser aimer pattern in the first frame or the second frame based on an absolute value of the difference between the first pixel data associated with the first frame and the second pixel data associated with the second frame.

20. The computer program product of claim 16, wherein the program instructions are further executable by the processor to cause the processor to:

capture the first frame using the laser aimer pattern;

capture the second frame without using the laser aimer pattern; and perform the image processing with respect to the barcode included in the first frame associated with the laser aimer pattern.

* * * * *